C. F. FRITCH.
RELIEF VALVE.
APPLICATION FILED APR. 11, 1916.
1,221,719.
Patented Apr. 3, 1917.
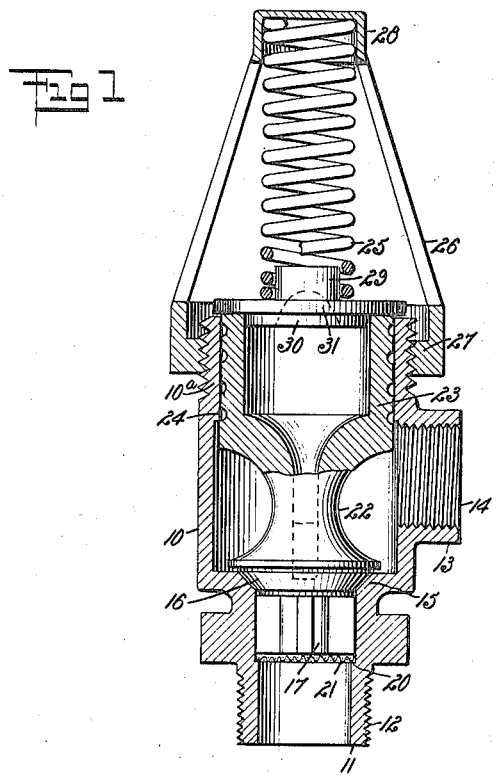
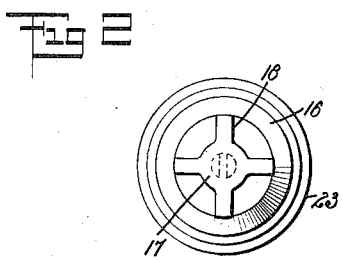
WITNESSES
INVENTOR
*Charles F. Fritch*
BY
ATTORNEYS

UNITED STATES PATENT OFFICE.

CHARLES F. FRITCH, OF DETROIT, MICHIGAN.

RELIEF-VALVE.

1,221,719.  Specification of Letters Patent.  Patented Apr. 3, 1917.

Application filed April 11, 1916. Serial No. 90,342.

*To all whom it may concern:*

Be it known that I, CHARLES F. FRITCH, a citizen of the United States, and a resident of Detroit, in the county of Wayne and State of Michigan, have invented a new and Improved Relief-Valve, of which the following is a full, clear, and exact description.

My improved valve, though capable of a wider use, is more particularly intended for use on range boilers as a safety valve or a relief valve in case of excessive steam pressure therein.

The invention will be particularly explained in the specific description following.

Reference is to be had to the accompanying drawings forming a part of this specification in which similar reference characters indicate corresponding parts in all the views.

Figure 1 is a longitudinal vertical section of a relief valve embodying my invention;

Fig. 2 is a front end view of the valve proper.

In carrying out my invention, a valve casing 10 is provided which has an inlet nipple 11 adapted to be tapped into a range boiler, or the like, said nipple having external threads 12. The casing 10 is provided with a lateral outlet nipple 13 having internal threads 14, and adapted to connect with any suitable discharge pipe (not shown).

Within the casing 10, is a conical valve seat 15 for a valve 16. At the under side of the valve 16 is a stem member 17 extending toward the inlet nipple 11 and formed with radial members 18 extending to the side walls of the casing which is of reduced diameter at this point. At the upper end of the inlet nipple 11, below the stem 17, is an internal annular shoulder 20 on the casing, said shoulder receiving a screen 21, which preferably, is of fine copper wire. The said screen is thus held between the stem 17 and the shoulder 20 and upon a slight longitudinal movement of the stem in the opening of the valve, any displacement of the screen will be parallel, and the screen will be restored to position upon the closing of the valve. The screen serves to prevent any solid matter being carried to the valve seat.

Above the conical valve 16, the main valve stem, 22, is contracted between the valve seat and the outlet 14 to permit a free flow of water and beyond the outlet 14, the valve casing is cylindrical as at 10ª, and the stem 22 is given the form of a cylindrical trunk piston 23 having a water-tight fit in the said cylinder. The piston 23 is made hollow to equalize the metal in said piston, and in the cylinder 10ª to equalize the contraction and expansion, and always insure a proper fit of the piston. The periphery of the piston 23 is formed with annular grooves 24 which assist in effecting a proper water-tight fit of the piston without packing.

To hold the valve 16 to its seat, a compression spring 25 is provided which is exterior of the valve casing so as not to come in contact with the steam, thus protecting it against rusting and enabling the spring employed to be simply japanned. The spring 25 is held in position by a yoke 26 which is provided with a ring flange 27, threaded onto the exterior of the cylinder 10ª of the casing. At the upper end the yoke 26 has a cup 28 receiving the adjacent end of the spring 25 while the opposite end of said spring embraces a stud 29 on a cap 30, said cap having an annular flange 31. The lower end of the cap 30 extends into the hollow interior of the piston 23 while the flange 31 extends laterally beyond the piston 23 so that any leakage of steam around the piston will be deflected laterally through the yoke 26 away from the spring 25.

The threaded connection between the yoke and valve casing permits of the yoke being adjusted to vary the tension of the spring 25.

Having thus described my invention I claim as new, and desire to secure by Letters Patent:

1. A relief valve including a casing having an inlet adapted for connection with a boiler and a discharge outlet, said casing having furthermore, a valve seat between the inlet and outlet, and having a cylindrical form beyond the outlet, a valve adapted to rest on said seat, said valve having a stem formed with a piston fitting the cylinder of the casing, and made hollow at the rear end, a cap on the said stem and fitting in the hollow rear end thereof, said cap having an annular flange extending laterally beyond the piston and overlapping the casing to deflect leaking steam outwardly, a compression spring seated on said cap, and a yoke over said spring and against which the spring abuts at the opposite end from the cap, the said yoke having threaded engagement with the valve casing to vary the pressure of the spring.

2. A valve including a casing having an inlet and an outlet, and a valve seat between said inlet and outlet, the casing furthermore, being formed with a cylinder beyond the outlet, a valve adapted to rest on said seat, the said valve having a stem formed with a piston fitting fluid-tight in the said cylinder, a cap on the piston at the outer end thereof outside of the casing, said cap having an annular lateral flange extending beyond the piston and overlapping the cylinder of the casing, a spring seating at one end on said cap outside of the valve casing, and means engaging said valve casing and against which means the opposite end of the spring abuts.

CHAS. F. FRITCH.

Witnesses:
T. H. EVANS,
LILLIE FRITCH.